June 27, 1967  D. L. MILLER  3,327,823
ELECTROMAGNETIC TOOTH CLUTCH
Filed March 7, 1966
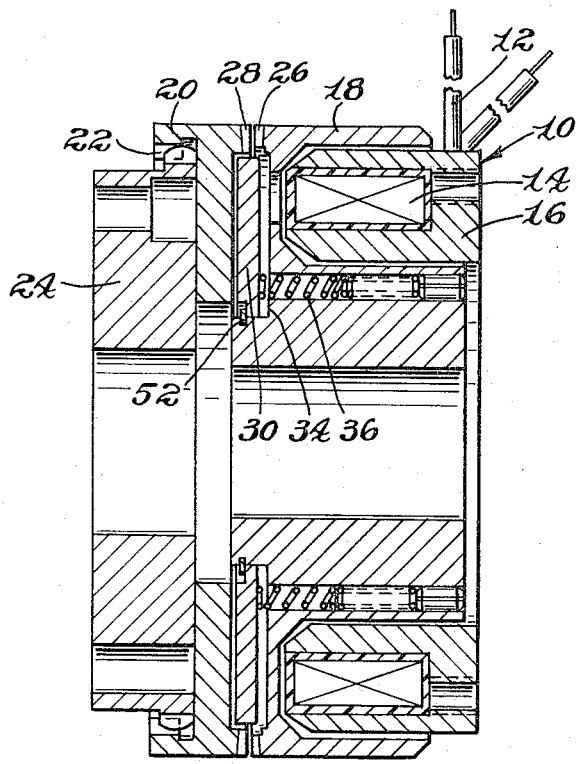
WITNESS:
Esther N. Stockton
INVENTOR.
Donald L. Miller
BY
David N. Wolcott
ATTORNEY

United States Patent Office 3,327,823
Patented June 27, 1967

3,327,823
ELECTROMAGNETIC TOOTH CLUTCH
Donald L. Miller, Horseheads, N.Y., assignor to The Bendix Corporation, a corporation of Delaware
Filed Mar. 7, 1966, Ser. No. 532,284
4 Claims. (Cl. 192—84)

The present invention relates to an electromagnetic tooth clutch or brake having a tooth angle approaching locking angle and an intermediate armature to aid tooth engagement to increase clutch torque transmitting capability and to produce clutch holding current.

The present invention is a companion case to U.S. Ser. No. 501,334 filed on Oct. 22, 1965 in the U.S. Patent Office, inventors Donald L. Miller and Charles A. Mendenhall and assigned to the assignee of the present invention. That application relates to electromagnetic tooth clutches wherein the tooth angle was less than a tooth locking angle.

Whenever tooth angle is less than tooth locking angle, a separation force will exist, tending to separate the clutch teeth and will, at a given high torque value, cause the separation of the clutch teeth imposing a maximum torque carrying capacity on the clutch. This torque capacity is further reduced by such factors as eccentricity, lack of parallelism, and vibration of the clutch parts and these factors are accentuated at high speed operation.

In known prior art electromagnetic tooth clutch designs wherein the torque transmitting mating clutch teeth are approaching or equalling tooth locking angle, engagement of the clutch teeth is difficult to achieve and in such clutches which are spring disengaged tooth clutches, tooth engagement is doubly difficult because it must be achieved against the disengaging spring force. The known prior art clutches of the type described require the clutch teeth to remain in engagement against the high force of the disengaging spring.

In known prior art electromagnetic tooth clutches, a strong disengaging spring biases the torque transmitting members apart. The strong spring was necessary to secure tooth disengagement because the clutch teeth at least approached self-locking. In such clutches, a very high flux density which requires a large number of ampere turns, was necessary to achieve clutch tooth engagement because it was necessary to overcome the large spring disengaging force. A large number of ampere turns is practically achieved by either increasing the number of turns of the coil or by increasing the current through the coil or by both methods. Either or both of these alternatives are expensive to the manufacturer and the consumer since they, in effect, require larger, heavier, and more expensive coils. As axial and radial vibration of the clutch parts during operation of the clutch, eccentricity of the clutch parts, and lack of parallelism of the clutch teeth caused clutch tooth separation in known prior art devices, the heavy disengaging spring acting directly between the clutch teeth aided separation of the clutch teeth, thereby effectively reducing the dynamic torque transmitting capacity of the clutch.

It is an object of the present invention to provide an electromagnetic tooth clutch having tooth angle approaching a locking tooth angle wherein tooth engagement is assured.

It is another object of the present invention to provide spring disengaged electromagnetic tooth clutch design having teeth approaching a locking tooth angle wherein an intermediate armature is operative to insure smooth dentil tooth engagement.

It is a still further object of the present invention to provide a novel electromagnetic tooth clutch having tooth angle approaching a locking tooth angle wherein an intermediate armature having a magnetically-saturable characteristic is employed to promote low holding current and to maintain dentil tooth engagement and to do so at low current levels.

It is a still further object of the present invention to provide a novel, compact, light weight, reliable magnetically-engaged spring disengaged electromagnetic clutch which has dentil teeth approaching a locking tooth angle and which is low in cost and high in performance, reliability, and efficiency.

The invention further lies in the particular organization of the various elements of the system and their cooperative association with one another to produce the beneficial results intended. The foregoing and other objects and advantages of the invention will appear more fully hereafter from the consideration of the detailed description which follows, taken together with the accompanying drawing wherein one embodiment of the invention is illustrated. It is to be expressly understood, however, that the drawing is for the purpose of illustration and description and is not to be construed as defining the limits of the invention. In the drawing wherein an electromagnetic clutch and brake embodying the invention is illustrated:

The single figure is a longitudinal view, in section, showing an electromagnetic clutch or brake.

Turning now to FIGURE 1, numeral 10 indicates generally an electromagnetic clutch having a pair of lead wires 12 to deliver current to the electromagnet 14 housed in the magnet body 16. In the embodiment shown, the magnet body 16 is stationary and is linked in the magnetic circuit to the first power transmitting member or magnet plate member 18 which is an annular torque transmitting or energy transmitting or absorbing member. Mounted coaxially with the first power member 18 is a second power member or armature plate member 20 which is splined by splines 22 to spider member 24 for axial movement relative to said spider member 24 and said first power member 18. First and second power members 18 and 20, respectively, each have a dentil or clutch tooth surface 26 and 28 formed respectively thereon for transmitting torque therebetween.

An annular saturable magnetic secondary armature member 30 is journalled or splined on the magnet plate member 18 for axial movement relative thereto. A plurality of disengaging springs 32 are employed to separate the clutch teeth 26 and 28 when no power is supplied to the electromagnet 14. The axial movement of the intermediate or secondary armature member 30 is limited by a split ring 52 or by the inner transverse face of the magnet plate member 34.

In operation, assuming that the clutch is in a disengaged position and the dentil teeth 26 and 28 are not engaged, when power is supplied in electromagnet 14, the intermediate or secondary armature member 30 which is a saturable magnetic annulus approaches saturation and is drawn adjacent to or in intimate contact with the transverse face 34 of the magnet plate member 18. As additional flux is built up in the magnetic circuit, the armature member 20 is drawn into contact with the magnet plate member 18. It can be readily seen that the intermediate or secondary armature member 30 is operative to compress the disengaging springs 36 so that the only force which the armature must overcome in moving into contact with the magnet plate member 18 is the friction force occurring at the splined connection 22 between the armature plate member 20 and the spider member 24. Since the armature plate member 20 is not having to overcome the force of the disengaged springs 36, it is more readily able to come into a full engagement with the magnet plate member clutch teeth 26, even though the clutch teeth 26 and 28 approach a tooth locking angle. In addition, this configuration permits a very low value of holding current since the secondary or intermediate armature member 30 may eliminate the air gap and conserve magnetic energy dissipation. Thus, the present invention is readily applicable to those electromagnets which are energized in two stages—a first stage for engagement and a second stage for holding.

It can be readily appreciated that the present invention achieves its stated objects of providing a low cost, high efficiency, high torque transmitting clutch which even though having dentil teeth approaching a locking tooth angle, is sure of tooth engagement without destroying or damaging the clutch teeth. Further, holding current values are severely reduced because of the disappearance of the air gap by the employment of the intermediate armature member 30.

In addition, disposing the secondary armature member intermediate of the torque transmitting member significantly reduces the number of ampere turns necessary to position the clutch members in a torque transmitting mode, thereby reducing clutch size, weight and cost. Still further, disposing the secondary armature intermediate of the torque transmitting members and spring biasing it relative to one of the torque transmitting members insures that the high disengaging spring force is not active to assist clutch disengagement during operation, thus reducing the effect of vibration, non-parallelism and eccentricity and increasing maximum torque capacity of the clutch.

The present invention encompasses electromagnetic tooth cutches which have mated teeth which equal or exceed tooth locking angle. The phrase "approaching tooth locking angle" as it is used in the specification and claims of this case is to be clearly understood to mean "at least approaching tooth locking angle." The present invention permits the use of clutch teeth having a locking angle thereby significantly increasing torque capacity of the clutch while avoiding the previously-noted problems present in prior art electromagnetic tooth clutches having teeth with a locking angle.

Thus, the present invention has disclosed a novel, highly reliable, rugged electromagnetic clutch or brake which is not subject to destruction of the clutch teeth because of clutch tooth mismatch and which has high torque transmitting capabilities.

I claim:
1. An electromagnetic clutch or brake comprising:
   an electromagnet;
   a first power transmitting member;
   a second power transmitting member axially aligned with said first power transmitting member;
   said power transmitting members adapted for mutual engagement;
   an annular saturable magnetic member disposed intermediate of said power transmitting members, said magnetic member axially movable with respect to said power transmitting members;
   resilient means to bias said saturable magnetic member toward one of said power transmitting members;
   said electromagnet operative when energized to move said annular saturable magnetic member substantially adjacent the other of said power transmitting members; and
   said electromagnet operative to substantially saturate said annular magnetic member and to move one of said power members into engagement with the other of said power members; and
   said power transmitting members are adapted for engagement by having dentil tooth surfaces integrally formed thereon having a tooth angle approaching a locking tooth angle.

2. The electromagnetic clutch or brake as claimed in claim 1 wherein:
   said saturable magnetic member is slidably mounted for axial movement on said first power transmitting member.

3. The electromagnetic clutch or brake as claimed in claim 1 wherein:
   said resilient means biases said power transmitting members through said saturable magnetic member in a clutch disengaged direction.

4. The electromagnetic clutch or brake as claimed in claim 1 wherein:
   said saturable magnetic member is formed into an annular ring; and
   said annular ring is disposed coaxially with said power transmitting members.

References Cited

UNITED STATES PATENTS

| | | | |
|---|---|---|---|
| 942,186 | 12/1909 | Ravenshaw | 192—84 |
| 2,698,679 | 1/1955 | Vernhes | 192—84 |
| 3,157,259 | 11/1964 | Bialek | 192—84 |

MARK NEWMAN, *Primary Examiner.*

A. T. McKEON, *Assistant Examiner.*